United States Patent
Otsuka et al.

(10) Patent No.: US 7,050,363 B2
(45) Date of Patent: May 23, 2006

(54) OPTICAL DISK DEVICE

(75) Inventors: Yoshiyuki Otsuka, Akishima (JP); Mitsumasa Kubo, Tachikawa (JP)

(73) Assignee: TEAC Corporation, Musashino (JP)

( * ) Notice: Subject to any disclaimer, the term of this patent is extended or adjusted under 35 U.S.C. 154(b) by 707 days.

(21) Appl. No.: 10/210,649

(22) Filed: Jul. 31, 2002

(65) Prior Publication Data
US 2003/0026175 A1 Feb. 6, 2003

(30) Foreign Application Priority Data
Aug. 1, 2001 (JP) ............................. 2001-233200

(51) Int. Cl.
*G11B 7/00* (2006.01)
*G11B 5/09* (2006.01)
(52) U.S. Cl. ............... 369/44.13; 369/47.5; 369/47.48; 369/53.23
(58) Field of Classification Search ............ None
See application file for complete search history.

(56) References Cited

U.S. PATENT DOCUMENTS

| | | | |
|---|---|---|---|
| 5,353,270 A | 10/1994 | Iimura | |
| 5,745,452 A | 4/1998 | Ko | |
| 6,377,528 B1 | 4/2002 | Asano | |
| 2002/0101797 A1* | 8/2002 | Ohta | 369/44.13 |

FOREIGN PATENT DOCUMENTS

| | | |
|---|---|---|
| CN | 1148712 A | 4/1997 |
| CN | 1249054 A | 3/2000 |
| JP | 05-054410 | 3/1993 |
| JP | 05-143995 | 6/1993 |
| JP | 11296858 A | 10/1999 |
| JP | 2000020968 A | 1/2000 |

\* cited by examiner

*Primary Examiner*—Muhammad Edun
(74) *Attorney, Agent, or Firm*—Christensen O'Connor Johnson Kindness PLLC

(57) ABSTRACT

An optical disk device for writing data onto an optical disk having a wobble track comprises an optical pickup for irradiating laser light of a writing power and laser light of a replaying power onto an optical disk and for converting return light from the optical disk into an electrical signal, a filter for extracting a wobble component contained in the return light signal when the laser of a writing power is irradiated, a processor for detecting the direction of track deviation based on the phase of the wobble component, and an actuator for driving the optical pickup in the width direction of the track based on the direction of the track deviation in order to control the tracking. Because the phase of the wobble component differs for a case when a light spot is deviated radially inward and for a case when a light spot is deviated radially outward, the direction of the track deviation can be detected based on the phase of the wobble component and the tracking can be controlled during data writing.

16 Claims, 5 Drawing Sheets

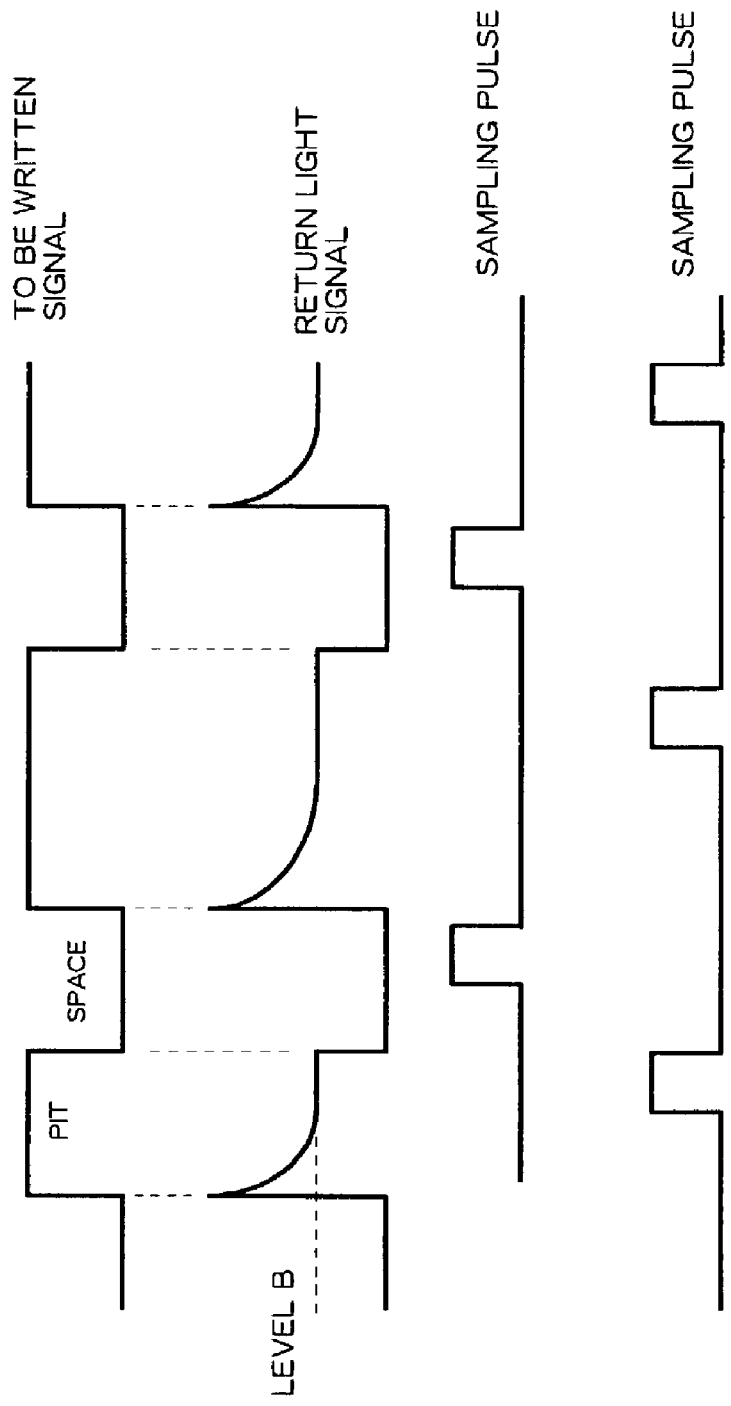

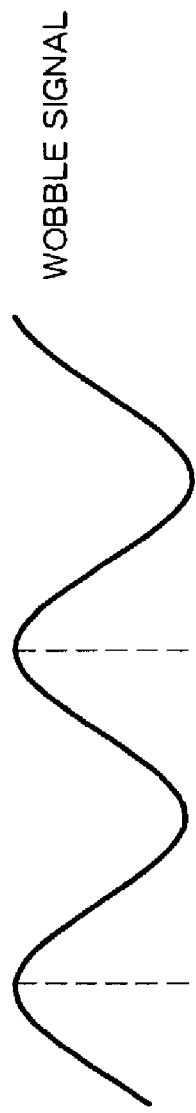

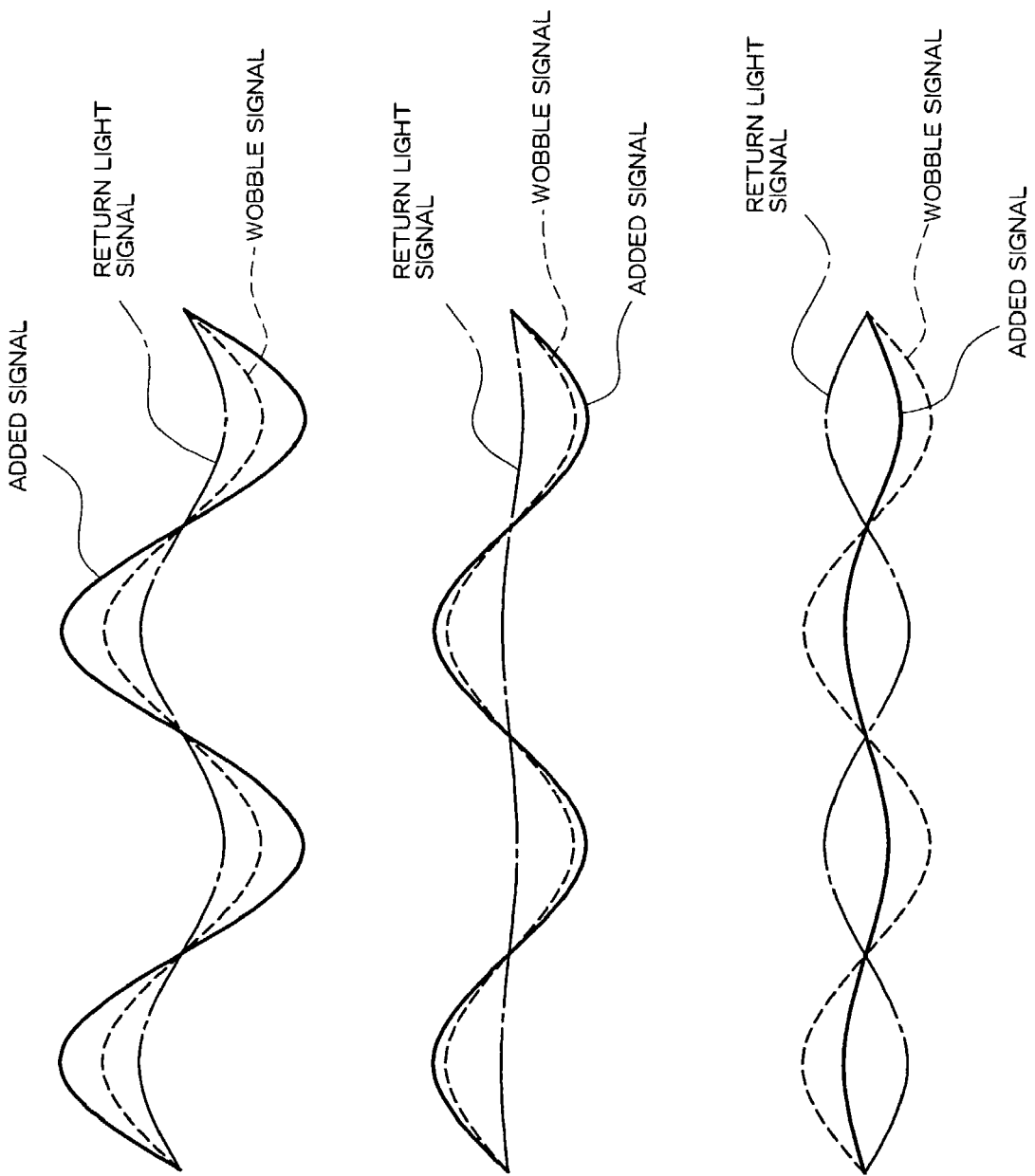

OPTICAL DISK DEVICE

BACKGROUND OF THE INVENTION

1. Field of the Invention

The present invention relates to an optical disk device, and in particular to an optical disk device for writing data onto an optical disk having a track which wobbles in a predetermined period ("wobble").

2. Description of the Related Art

In an optical disk device for wiring data onto an optical disk such as a CD-R, because of reasons such as unevenness of the optical disk, film characteristics of the optical disk, and wavelength shift in a laser diode (LD), there are cases in which a pit may not be formed at the center of a track and data is written at a position deviated from the track center. During data writing of a CD-R, a light of a replaying power is irradiated in the space period of the data to be written and a signal representing return light from the optical disk is sampled and held to execute a focus servo process and a tracking servo process. When the power is increased from the replaying power to a writing power, the optical constant of the optical system including the LD is changed, causing the laser to deviate from the track center during a pit pattern forming period of the data to be written, thereby degrading the quality of the written or replayed signals.

Because the amount of deviation from the track center varies among optical disk devices, although a constant amount of deviation may be stored in a memory for adjusting the tracking offset during the data writing using the stored amount of deviation, as the amount of deviation is simply a representative value, the tracking cannot always be precisely corrected.

Japanese Patent Laid-Open Publication No. 2000-20968 discloses that, when laser light is irradiated onto an optical disk onto which a wobbled track (or "wobblet") is formed, an undulation period component contained in a signal representing return light from the optical disk when data is written is detected and the servo balance is adjusted so that the level of this undulation period component is minimized or substantially minimized.

However, there is a problem in that the servo balance cannot be quickly adjusted by simply adjusting the servo balance based on the level of the undulation period component alone. In other words, even when an attempt is made to minimize the size of the undulation period component, because it is unknown whether the laser light should be translated to the right or to the left with respect to the track, there is a problem in that a significant amount of time elapses before the undulation period component can be converged to a minimum value.

SUMMARY OF THE INVENTION

Accordingly, an object of the present invention is to provide an optical disk device in which a tracking control can be quickly performed even during data writing.

According to one aspect of the present invention, there is provided an optical disk device comprising irradiating means for irradiating laser light onto an optical disk; converting means for converting return light of the laser light from the optical disk into an electrical signal; wobble component detecting means for detecting a wobble component contained in the return light signal during a period in which laser light of a writing power is irradiated from the irradiating means; and controlling means for controlling tracking of the laser light based on the phase of the wobble component. According to the present invention, a wobble component is detected during a period when laser light of a writing power is irradiated, that is, during when data is written. The phase of the wobble component varies depending on whether the track deviation is radially inward or radially outward on the optical disk. Thus, the direction of track deviation is detected during data writing and the tracking can be controlled.

According to another aspect of the present invention, laser light of a writing power is irradiated during a pit forming period (marking period), a signal representing return light is sampled at the timing when the level of the return light signal from the optical disk becomes level B, and the wobble component is extracted. On the other hand, during the space period, laser light of a replaying power is irradiated, a signal representing return light from the optical disk is sampled, and a wobble signal is extracted. The wobble signal is a signal primarily used for demodulating address information. The phase of the wobble signal and the phase of the wobble component are compared, and the direction of the track deviation is determined from the result of comparison.

While the present invention can be more readily understood with reference to the following description of the preferred embodiment, the scope of the present invention is not limited to the embodiment.

BRIEF DESCRIPTION OF THE DRAWINGS

FIG. 2A is a diagram showing a waveform of a writing signal.

FIG. 2B is a diagram showing a waveform of a signal representing return signal.

FIG. 2C is a diagram showing a waveform of a sampling pulse.

FIG. 2D is a diagram showing a waveform of another sampling pulse.

FIG. 3A is a diagram showing a waveform of a wobble signal.

FIG. 3B is a diagram showing a waveform of a wobble component for a track deviation state (radially inward).

FIG. 3C is a diagram showing a waveform of a wobble component for an on-track state.

FIG. 3D is a diagram showing a waveform of a wobble component for a track deviation state (radially outward).

FIG. 5A is a diagram showing a waveform of an added signal for a track deviation state (radially inward).

FIG. 5B is a diagram showing a waveform of an added signal for an on-track state.

FIG. 5C is a diagram showing a waveform of an added signal for a track deviation state (radially outward).

DESCRIPTION OF PREFERRED EMBODIMENT

Figure 1:
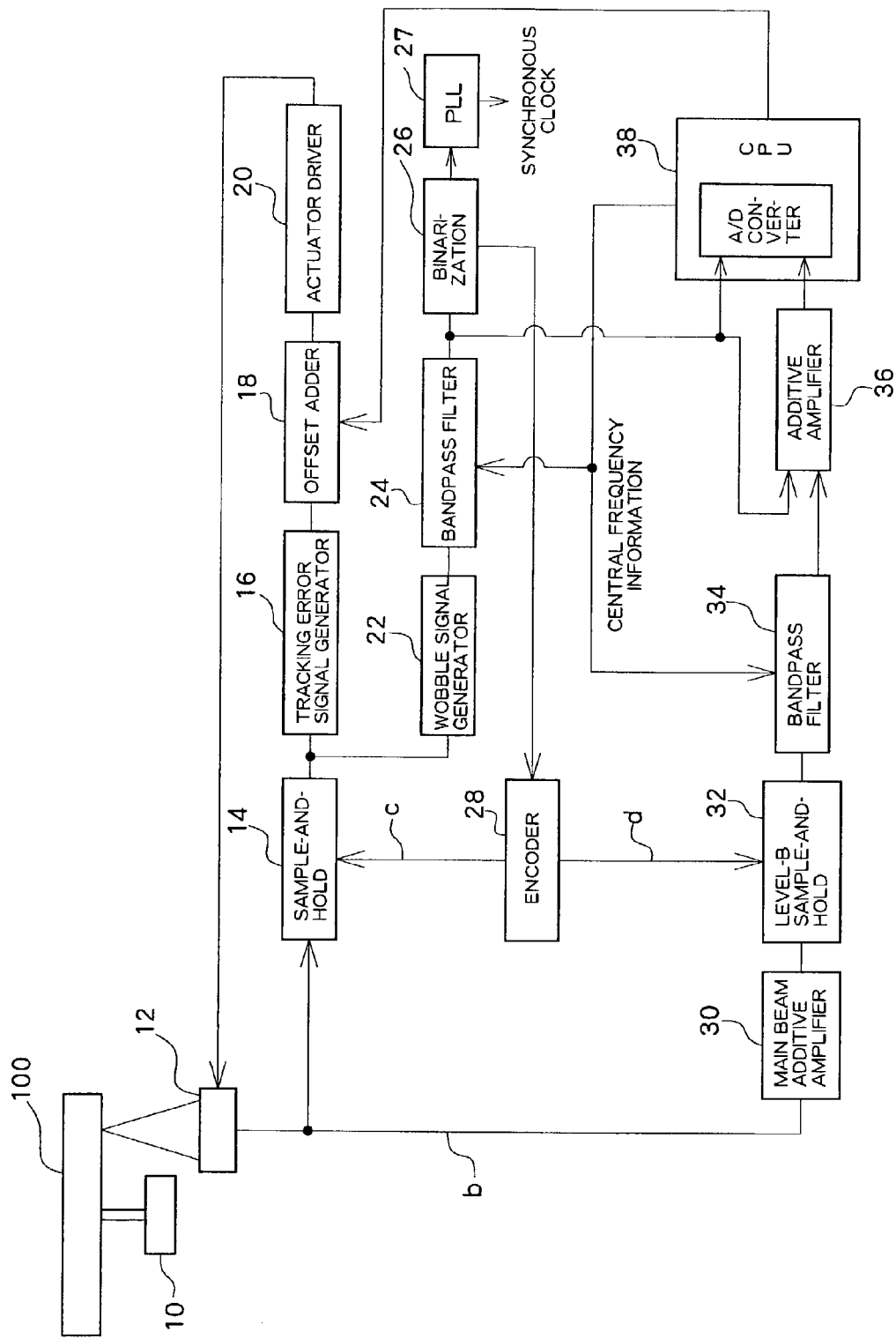
FIG. 1 is a structural block diagram showing an optical disk device.

A preferred embodiment of the present invention will now be described referring to the drawings.

FIG. 1 is a structural block diagram of an optical disk device according to the embodiment. An optical pickup section 12 writes and replays data by irradiating laser light onto an optical disk 100 which is rotationally driven by a spindle motor 10. On the optical disk 100, a track or a pre-groove which wobbles in a predetermined period (for example, with a reference frequency of 22.05 kHz) (hereinafter, this track is referred to as a "wobble") is formed. By replaying the wobble, the address information in the optical disk 100 is detected. The optical pickup section 12 irradiates, when replaying a signal, laser light of a replaying power and outputs a signal representing the return light. When data is to be written, on the other hand, the optical pickup section 12 irradiates laser light of a writing power and outputs a signal representing the return light. During the space period of the data to be written, the optical pickup section 12 reduces the laser power from the writing power to the replaying power and outputs a signal representing the return light. From the return light signal, a servo signal and a wobble signal are replayed. The return light signal from the optical pickup section 12 is supplied to a sampling and holding circuit 14.

The sampling and holding circuit 14 samples and holds the return light signal during data writing for a predetermined period and outputs the held signal to a tracking error signal generating circuit 16 and to a wobble signal generating circuit 22. The timing for sampling is supplied from an encoder 28. The encoder 28 supplies, to the sampling and holding circuit 14, a sampling signal which is synchronized to the period when the laser power of a replaying power is irradiated during data writing, that is, the space period of the data to be written.

The tracking error signal generating circuit 16 generates a tracking error signal based on a signal from the sampling and holding circuit 14. For example, the tracking error signal generating circuit 16 generates a tracking error signal by calculating a difference between signals obtained by split components of a four-way split light receiving element of the optical pickup section 12, split into two components in the radial direction of the optical disk. More specifically, the laser light is split into three beams so that a main beam is irradiated as the center beam onto the optical disk 100 and two sub-beams are irradiated onto the optical disk 100 at positions respectively shifted from the position of the main beam in the radial direction by approximately ½ of the pitch of the track. Then, the return light of each of the main beam and the sub-beams are respectively captured by separate right-left split light receiving elements and push-pull signals are detected which respectively represent the difference between the levels of the right and left components detected by the right-left split light receiving element. If the push-pull signal for the main beam is represented as "TEM" and the respective push-pull signals for the sub-beams are represented as "TES1" and "TES2", a signal, TEDPP calculated using a formula, TEDPP=TEM−TES1+TES2)/2, is generated as a tracking error signal. By controlling so that the tracking error signal becomes 0, it is possible to allow the main beam to follow the central line of the track.

During data writing, because the RF signal representing the return light becomes unstable as the result of the output power for the laser light of the writing power being greater than that for the laser light of the replaying power or an optical imbalance during the process of forming a pit, a DC offset may be produced in the tracking error signal. Therefore, in order to prevent increase in the DC offset during the data writing, the sampling process is performed during the space period (when laser light of a replaying power is used) in the data to be written to generate a tracking error signal. After an offset is added to the tracking error signal by an offset adding circuit 18, as will be described below in more detail, the tracking error signal is supplied to an actuator driver 20. The actuator driver 20 outputs a servo control signal to the optical pickup 12 for controlling the tracking.

The wobble signal generating circuit 22 generates a wobble signal based on the signal from the sampling and holding circuit 14. For example, the wobble signal generating circuit 22 removes an EFM modulation component by calculating a difference between signals from the light receiving element of the optical pickup section 12 which is split in the radial direction of the optical disk 100, and extracts a wobble signal. More specifically, the signals obtained by receiving, in the light receiving element split in the radial direction, reflection light which is modulated depending on the presence/absence of the pit (EFM modulation) are in phase and the wobble signals received in the light receiving surfaces have opposite phases. Therefore, by calculating the difference between the output signals, it is possible to eliminate the EFM modulation component and to obtain the wobble signal. The wobble signal is appropriately amplified and supplied to a bandpass filter 24. The bandpass filter 24 is a filter having, as the central frequency, the reference frequency of the wobble (22.05 kHz), removes noise other than the wobble signal from the input signal, and outputs the resulting signal to a binarization circuit 26. The binarization circuit 26 binarizes the wobble signal and outputs the resulting signal to the encoder 28. The binary signal from the binarization circuit 26 is also supplied to a PLL circuit 27 and a demodulating circuit (not shown). A clock signal which is synchronized to the binary signal is generated by the PLL circuit 27 and address information (ATIP) is demodulated.

In CD-R, CD-RW, or the like, address information is demodulated from the wobble signal as described above. In DVD-RAM or the like, on the other hand, the address information is separately formed by pre-pits and the wobble signal is used for controlling the rotation of the optical disk or as a clock signal for writing data. More specifically, the signal from the binarization circuit 26 is supplied to the PLL circuit 27 where a synchronization clock signal is generated and supplied to a microcomputer for controlling the rotation. Because the synchronization signal is synchronized with the rotation of the optical disk, the microcomputer can control the number of rotations of the optical disk per unit time to a desired value by monitoring the clock signal. When the synchronization clock is used as a clock for writing data, an advantage can be obtained in that, even when the number of rotations of the optical disk per unit time is varied, the position for writing data on the optical disk does not change. Such a jitter-free writing of data is disclosed in, for example, Japanese Patent Laid-Open Publication No. Hei 11-296858.

The signal from the sampling and holding circuit 14 is also supplied to a focus error signal generating circuit (not shown) which generates a focus error signal to execute focus servo operations.

The encoder 28 generates and supplies sampling pulses synchronized with the wobble signal based on the input binary signal. There are two types of sampling pulses, one having a sampling timing synchronized with the replaying power, that is, the space period of the data to be written as described above, and the other having a sampling timing synchronized to the later period in the writing power, in particular, when the amount of return light is at level B. These sampling timings are synchronized with the timing of the wobble signal because the wobble signal and the return light signal are added in the subsequent steps.

FIGS. 2A–2D respectively show timing charts for data to be written, return light signal, and two types of sampling signals output from the encoder 28.

FIG. 2A shows the data to be written which comprises a pit forming (marking) period and a space period. During the pit forming period, a writing power (for example, 20 mW) is employed, and a replaying power (for example, 1 mW) is employed during the space period. FIG. 2B shows a signal representing return light when the data to be written as shown in FIG. 2A is written. During the pit forming period, because the power of the laser light is changed to a writing power, the level of the return light signal is also increased, and the return light signal is subsequently decreased to level B. The level B is a level created by the interference by the pit after the pit is formed and is substantially stable. During the space period, because the power of the laser light is changed to the replaying power, the level of the return light signal is reduced. Because no pit is formed during the space period, the level of the return light signal is approximately constant throughout the period.

FIG. 2C shows a sampling pulse from the encoder 28 for tracking and wobbles which is synchronized with the space period of the data to be written. FIG. 2D shows the other sampling pulse from the encoder 28 which is synchronized with the pit forming period of the data to be written, and more precisely, with the period in which the level of the return light signal becomes level B. In the present embodiment, the track deviation and the direction of the track deviation during the data writing are detected based on a signal sampled and held according to the sampling pulse shown in FIG. 2D.

Referring back to FIG. 1, the return light signal from the optical pickup section 12 is also supplied to a main beam additive amplifier 30. The main beam additive amplifier 30 adds all signals from the light receiving elements of the optical pickup section 12 to the main beam irradiated to the optical disk 100 as described above, and supplies the result to a sampling and holding circuit 32.

A sampling pulse from the encoder 28 (refer to FIG. 2D) is supplied to the sampling and holding circuit 32. The sampling and holding circuit 32 samples and holds at the supplied timing, that is, at the timing when the return light signal becomes level B, and outputs the result to a bandpass filter 34. Similar to the bandpass filter 24, the bandpass filter 34 has, as the central frequency, the reference frequency of the wobble signal (22.05 kHz), extracts a wobble component from the signal from the additive amplifier 30 and outputs the extracted wobble component. It should be noted that the wobble component differs from the wobble signal as described above and is a wobble component contained in the RF signal obtained through addition and representing return light. The wobble component is not a signal representing difference in RF signals representing return light.

In the description of the present embodiment, the terms "wobble signal" and "wobble component" are used to indicate different concepts. The "wobble signal" is a wobbled track component contained in a signal representing a difference between signals output from photodetectors split in the radial direction of the disk when laser light is irradiated onto the wobbled track. On the other hand, the "wobble component" is a wobbled track component contained in a signal representing a sum of signals output from photodetectors split in the radial direction of the disk. The former is used for demodulating address information and the latter is used for detecting track deviation. When the data writing period is divided into a pit period (marking period) and space period, the "wobble signal" is generated from replayed signals obtained by irradiating laser light of a replaying power during the space period and the "wobble component" is generated from replayed signals obtained by irradiating laser light of a writing power during the marking period. In the on-track state, because a subtraction is applied for the signals from a radially inward position and a radially outward position of the wobbled track, the amplitude of the "wobble signal" becomes larger, while the amplitude of the "wobble component" becomes smaller because an addition is applied for the signals from a radially inward position and a radially outward position of the wobbled track.

FIGS. 3B–3D schematically show wobble components output from the bandpass filter 34. For purpose of comparison, a wobble signal extracted by the bandpass filter 24 is shown in FIG. 3A. The wobble component output from the bandpass filter 34 can generally be classified into three categories, the first being a signal, as shown in FIG. 3B, which is in phase with the wobble signal, the second being a signal which is substantially zero (0) as shown in FIG. 3C, and the third being a signal, as shown in FIG. 3D, having an opposite phase with respect to a signal shown in FIG. 3B, that is, an opposite phase with respect to the wobble signal. When the laser light for writing is positioned approximately at the center of the track (on-track state), the wobble component is approximately zero (0) because the coverage of the wobble is large. On the other hand, when the laser light for writing is deviated radially inward or radially outward from the center of the track (track deviation or "detrack"), the coverage of the wobble is decreased and the amplitude of the wobble component is consequently increased. Because the ratio of a portion of the laser light spot on the track to the portion off the track is reversed for a radially inward position compared to the case of a corresponding radially outward position, the phases are opposite to each other. Therefore, when, for example, the signal in phase with the wobble signal represents a radially inward position, because the signal shown in FIG. 3B is in phase with the wobble signal, the signal shown in FIG. 3B is deviated radially inward while the signal shown in FIG. 3D is deviated radially outward because the signal shown in FIG. 3D is of opposite phase than the wobble signal.

The determination of track deviation in the radially inward direction when the wobble component is in phase with the wobble signal and of track deviation in the radially outward direction when the wobble component has a phase opposite of that of the wobble signal is only an example configuration. The direction of the track deviation is determined based on the subtraction operation for obtaining the wobble signal. More specifically, when the subtraction operation for obtaining the wobble signal is (signal obtained by the photodetector at a radially inward position)–(signal obtained by the photodetector at a radially outward position), it is determined that the direction of track deviation is radially inward when the wobble component is in phase with the wobble signal. On the other hand, when the subtraction operation for obtained the wobble signal is (signal obtained by the photodetector at a radially outward position)–(signal obtained by the photodetector at a radially inward position), it is determined that the direction of track deviation is radially inward when the wobble component has a phase opposite of that of the wobble signal.

Figure 4A:
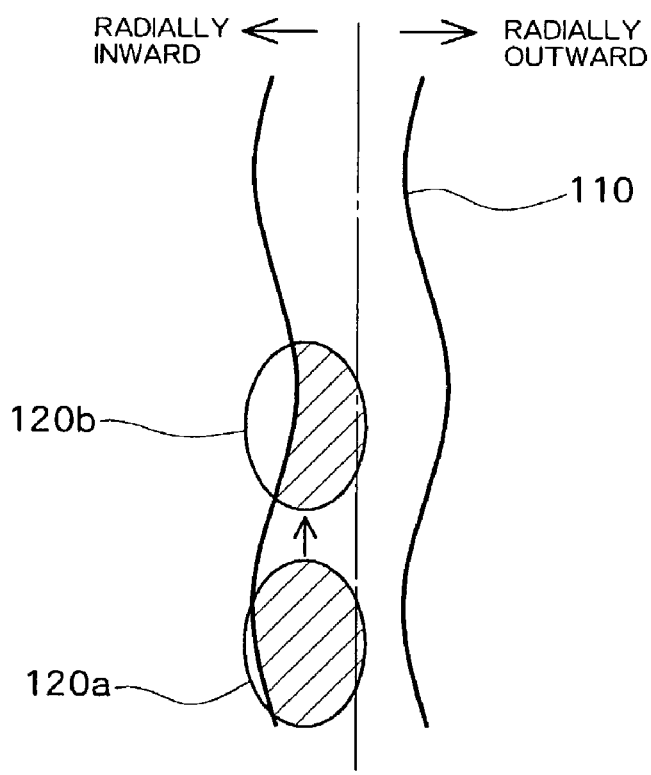
FIG. 4A is a diagram for explaining the relationship between a wobble and a light spot deviated radially inward.
Figure 4B:
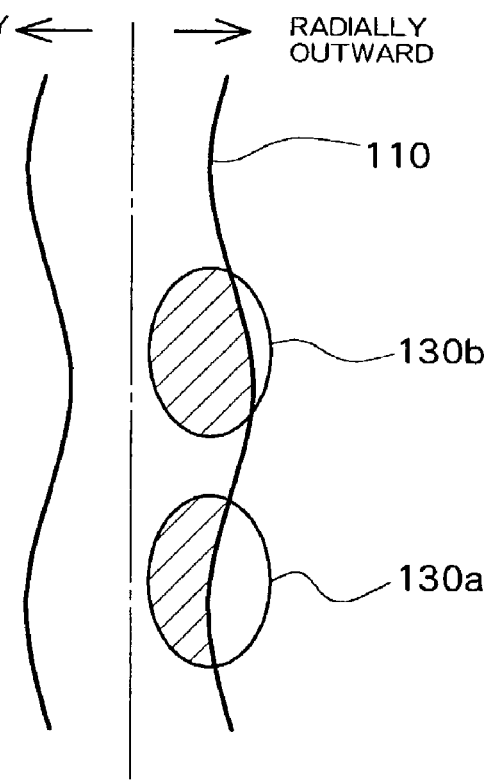
FIG. 4B is a diagram for explaining the relationship between a wobble and a light spot deviated radially outward.

FIGS. 4A and 4B schematically show the relationship between a wobble 110 and a spot of laser light for writing. FIG. 4A shows a case where the spot is deviated radially inward with respect to the center line of the wobble 110 (shown in the figure by a dot-dash line). In this state, by a relative movement of the spot from 120a to 120b, a wobble component is superimposed to the return light signal. Similarly, FIG. 4B shows a case where the spot is deviated radially outward with respect to the center line of the wobble 110, and, in this state, by a relative movement of the spot from 130a to 130b, a wobble component is superimposed on the return light signal. Assuming that the spots 120*a* and 130*a* correspond to the same position of the track and the spots 120*b* and 130*b* correspond to the same position of the track, it can be seen that the percentage of the irradiated spot area on the track in spot 120*a* (shown as a hatched area in the figure) is relatively large while that of the spot 130*a* is relatively small. Similarly, it can be seen that the percentage of the irradiated spot area on the track in spot 120*b* is small while that of the spot 130*b* is relatively large. It can thus be seen that the phase of the wobble component differs by 180 degrees depending on whether the spot is deviated radially inward or radially outward with respect to the wobble 110.

As described, the presence of a track deviation and the direction of the track deviation can be determined based on the phase of the wobble component obtained from the bandpass filter 34. Therefore, when it is determined, based on the phase of the wobble component, that there is a track deviation in the radially inward direction, an offset can be added to the tracking error signal by the offset adding circuit 18 so that the optical pickup 12 moves radially outward. On the other hand, when it is determined, based on the phase of the wobble component, that there is a track deviation in the radially outward direction, an offset can be added to the tracking error signal by the offset adding circuit 18 so that the optical pickup 12 moves radially inward. In this manner, it is possible to quickly correct the tracking error and control the optical pickup to be in the on-track state.

There are various methods for determining the phase of the wobble component. In the present embodiment, instead of adjusting the offset of the tracking error signal directly from the phase of the wobble component output from the bandpass filter 34, the match/mismatch of the phases of wobble signal from the bandpass filter 24 and the signal from the bandpass filter 34 is determined by adding these signals. In other words, in FIG. 1, the wobble component from the bandpass filter 34 and the wobble signal from the bandpass filter 24 are both supplied to and added by an additive amplifier 36. The result of the addition is then supplied to a CPU 38. The CPU 38 compares the level of the added signal with the level of the wobble signal and determines match/mismatch of the phases of the signals based on the magnitude.

FIGS. 5A–5C show signals that can be obtained as a result of addition in the additive amplifier 36. FIG. 5A shows the result of addition of the wobble signal of FIG. 3A and the wobble component shown in FIG. 3B, that is, when the direction of the track deviation is radially inward. The broken line represents the wobble signal, the dot-dash line represents the wobble component, and the solid line represents a signal obtained by adding the wobble signal and the wobble component. When the direction of track deviation is radially inward, the wobble component is in phase with the wobble signal, and thus, the amplitude of the added signal becomes greater than the wobble signal. FIG. 5B shows the result of addition of the wobble signal of FIG. 3A and the wobble component shown in FIG. 3C, that is, when the laser is substantially in an on-track state. The amplitude of the added signal is approximately equal to the amplitude of the wobble signal. FIG. 5C shows the result of addition of the wobble signal of FIG. 3A and the wobble component shown in FIG. 3D, that is, when the direction of track deviation is radially outward. When the direction of track deviation is radially outward, because the wobble component has an opposite phase from the phase of the wobble signal, the wobble component and wobble signal weakens each other, resulting in an added signal having a reduced amplitude.

These three cases can be summarized as follows.
(1) On-track state
  Amplitude of the wobble signal≈amplitude of the added signal
(2) Track deviation state (radially inward)
  Amplitude of the wobble signal<amplitude of the added signal
(3) Track deviation state (radially outward)
  Amplitude of the wobble signal>amplitude of the added signal As described, because the amplitude of the added signal clearly differs for cases of an on-track state, a track deviation state in the radially inward direction, and a track deviation state in the radially outward direction, the CPU 38 can univocally determine the presence of track deviation and the direction of the track deviation by A/D converting the wobble signal and the added signal and comparing the amplitude of these signals.

More specifically, a signal representing the difference is calculated using the formula, difference signal=(wobble signal)−(added signal), and the state can be determined by the sign (i.e. positive or negative) of the difference signal. In other words, it is determined that there is a track deviation in the radially outward direction when the sign is positive (+), that there is a track deviation in the radially inward direction when the sign is negative (−), and that there is no track detraction (on-track state) when the difference signal is substantially zero (0). In the present embodiment, the wobble component is obtained by sampling the return light in the period in which the return light becomes level B during the writing power period (pit period or marking period) while the wobble signal is obtained by sampling the return light during the replaying power period (space period). Therefore, the timing for extracting the wobble component differs from the timing for extracting the wobble signal, and thus, when these two signals are added by the additive amplifier 36, the timings for the signals are adjusted before the signals can be added.

In the present embodiment, because the amplitude of the wobble signal and the amplitude of the added signal are compared, it is possible to accurately determine the amplitude relationship between the signals even when the level of the wobble signal is varied, as the level of the added signal is also correspondingly varied. When the level of the wobble signal is maintained as a constant by AGC or the like, it is possible to compare the amplitude of the added signal with a constant level.

After the direction of the track deviation is detected, the offset of the tracking error signal can be adjusted so as to eliminate the detected track deviation.

In the above description, a preferred embodiment of the present invention is described. However, the present invention is not limited to the embodiment and various modifications can be made. For example, in the above description, the correction process for track deviation is performed when data is written, but the present invention can also be applied in the process for optimizing the writing power (OPC) by writing trial data in a test area (PCA) of the optical disk 100, in order to optimize the writing power by reliably writing the trial data under an on-track state.

The embodiment is described using the CD-R as an example, but the present invention can be similarly applied to any drive for a CD-RW, a DVD-R, a DVD-RW, a DVD-RAM, or the like.

Moreover, while in the description of the embodiment, the wobble signal is generated by sampling, in the sampling and holding circuit 14, when the power is set to the replaying power during data writing, that is, in the space period of the data to be written, it is also possible that the sampling process be performed when the power is set to the writing power. More specifically, the wobble signal can be generated by sampling the return light in the period in which the laser level is at the level B.

In the embodiment, the wobble component is extracted during the period when laser light of a writing power is irradiated and the direction of the track deviation is determined based on the phase of the wobble component and the phase of the wobble signal. In FIG. 5A, as the amount of track deviation in the radially inward direction becomes larger, the amplitude of the added signal also becomes larger. In FIG. 5C, as the amount of track deviation in the radially outward direction becomes larger, the amplitude of the added signal correspondingly becomes smaller. Thus, it is possible to evaluate not only the direction of the track deviation, but also the amount of track deviation from the amplitude of the added signal. In the conventional method for tracking, the tracking control is performed during the space period. The present embodiment, on the other hand, also allows tracking control during the marking period. Because of this, by employing the method of the present embodiment, it is possible to perform tracking control at any point in the entire period when data is written. For example, according to the method of the embodiment, it is possible to not perform the tracking control during the space period and to perform the tracking control only during the marking period. It is also conceivable that the tracking control can be switched based on the pattern of the data to be written. For example, for a data string having a relatively long marking period, the tracking control can be performed only during the marking period. Alternatively, for a data string having a relatively short marking period, the tracking control can be performed during the space period similar to the conventional method.

What is claimed is:

1. An optical disk device for writing data onto an optical disk having a track that wobbles in a predetermined period, said optical disk device comprising:
   irradiating means for irradiating laser light onto said optical disk;
   converting means for converting return light of said laser light from said optical disk into an electrical signal;
   wobble component detecting means for detecting a wobble component contained in the return light signal during a period in which laser light of a writing power is irradiated from said irradiating means; and
   controlling means for controlling tracking of said laser light based on the phase of said wobble component.

2. An optical disk device according to claim 1, wherein said converting means is split into at least two means in the radial direction of said optical disk; and
   said wobble component detecting means detects said wobble component from a signal representing the sum of signals from said converting means split into two means.

3. An optical disk device according to claim 1, wherein said wobble component detecting means detects said wobble component during a period in which the level of said return light signal is at level B, which is a substantially stable level reached by said return light signal.

4. An optical disk device according to claim 1, further comprising:
   wobble signal detecting means for detecting a wobble signal which indicates said wobble track, wherein said controlling means controls the tracking based on the phase of said wobble signal and the phase of said wobble component.

5. An optical disk device according to claim 4, wherein said converting means is split into at least two means in the radial direction of said optical disk;
   said wobble signal detecting means detects said wobble signal from a signal representing the difference between the signals from said converting means split into two means; and
   said wobble component detecting means detects said wobble component from a result of addition of signals from said converting means split into two means.

6. An optical disk device according to claim 5, wherein said wobble signal detecting means detects said wobble signal from said difference signal between return light during a period in which laser light of a replaying power is irradiated from said irradiating means.

7. An optical disk device according to claim 5, wherein said wobble signal detecting means detects said wobble signal from said difference signal between return light during a period in which said laser light of a writing power is irradiated from said irradiating means.

8. An optical disk device according to claim 4, wherein said controlling means comprises:
   adding means for adding said wobble signal and said wobble component; and
   comparing means for comparing amplitude of the signal obtained by the addition and the amplitude of said wobble signals.

9. An optical disk device for writing data onto an optical disk having a track that wobbles in a predetermined period, said optical disk device comprising:
   an optical pickup having a laser diode for irradiating laser light of a writing power and laser light of a replaying power onto an optical disk and a photodetector for converting return light from said optical disk into an electrical signal;
   a filter for extracting a wobble component contained in the return light signal from said photodetector when said laser light of a writing power is irradiated;
   a processor for detecting a direction of a track deviation based on the phase of said wobble component; and
   an actuator for driving said optical pickup in the width direction of the track based on said direction of track deviation to control the tracking.

10. An optical disk device according to claim 9, further comprising:
   a second filter for extracting a wobble signal contained in a return light signal from said photodetector when said laser light of a replaying power is irradiated, wherein said processor detects the direction of said track deviation based on the phase of said wobble component and the phase of said wobble signal.

11. An optical disk device according to claim 10, wherein said photodetector is split into at least two components in the radial direction of said optical disk;
   said filter extracts said wobble component from an added signal representing the sum of signals from said photodetector split into two components; and
   said second filter extracts said wobble signal from a difference signal representing a difference between signals from said photodetector split into two components.

12. An optical disk device according to claim 11, further comprising:
an adder for adding said wobble signal and said wobble component, wherein
said processor detects the direction of said track deviation by comparing the amplitude of said added signal and the amplitude of said wobble signal.

13. An optical disk device according to claim 9, further comprising:
a second filter for extracting a wobble signal contained in a return light signal from said photodetector when said laser light of a writing power is irradiated, wherein
said processor detects the direction of said track deviation based on the phase of said wobble component and the phase of said wobble signal.

14. An optical disk device according to claim 13, wherein
said photodetector is split into at least two components in the radial direction of said optical disk;
said filter extracts said wobble component from an added signal representing the sum of the signals from said photodetector split into two components; and
said second filter extracts said wobble signal from a difference signal representing a difference between signals from said photodetector split into two components.

15. An optical disk device according to claim 14, further comprising:
an adder for adding said wobble signal and said wobble component, wherein
said processor detects the direction of said track deviation by comparing the amplitude of said added signal and the amplitude of said wobble signal.

16. An optical disk device according to claim 9, further comprising:
a sampling circuit for sampling a signal during a certain portion of the period when said laser light of a writing power is irradiated in which a formed pit interferes with the return light signal from said photodetector and the signal level is substantially constant and for outputting the sampled signal to said filter.

* * * * *